United States Patent [19]

Slaughter

[11] 4,280,629
[45] Jul. 28, 1981

[54] CONTAINER FOR NAIL POLISH OR THE LIKE

[75] Inventor: Bobby L. Slaughter, Wildwood Estates, Tenn.

[73] Assignee: Anchor Brush Company, Inc., Aurora, Ill.

[21] Appl. No.: 148,100

[22] Filed: May 9, 1980

Related U.S. Application Data

[63] Continuation of Ser. No. 1,820, Jan. 8, 1979, abandoned.

[51] Int. Cl.³ .................. B65D 1/02; B65D 23/00; B29C 17/07
[52] U.S. Cl. .................. 215/1 C; 260/42.21; 264/40.6; 264/78; 264/526; 264/537; 428/35
[58] Field of Search .............. 264/537–539, 264/78, 40.1, 40.6, 526; 428/35; 215/1 C; 260/42.21

[56] References Cited

U.S. PATENT DOCUMENTS

| | | | |
|---|---|---|---|
| 2,642,404 | 6/1953 | Pike | 260/42.43 X |
| 3,412,186 | 11/1968 | Piotrowski | 425/533 X |
| 3,728,312 | 4/1973 | Schneider et al. | 264/537 X |
| 3,733,309 | 5/1973 | Wyeth et al. | 428/35 |
| 3,822,332 | 7/1974 | Hrach et al. | 264/537 |
| 3,931,074 | 1/1976 | Gomez | 215/1 C X |
| 4,108,827 | 8/1978 | La Liberte | 260/42.21 |

*Primary Examiner*—Jan H. Silbaugh
*Attorney, Agent, or Firm*—David R. Treacy

[57] ABSTRACT

A colorless plastic bottle for nail polish or the like, and a method of making such a bottle. The bottle is blow molded from a color-free barrier resin such as a rubber modified acrylonitrile-methylacrylate copolymer. Tinting to compensate for inherent coloration is performed during melting in a reciprocating screw injection unit. By close control of processing temperature and injection and molding conditions a transparent bottle free of color unevenness or burns is obtained.

10 Claims, 3 Drawing Figures

CONTAINER FOR NAIL POLISH OR THE LIKE

This is a continuation of application Ser. No. 001,820, filed Jan. 8, 1979, now abandoned.

BACKGROUND OF THE INVENTION

1. Field of the Invention

The invention relates to transparent, colorless containers for liquids containing strong solvents such as acetone, for example nail polish bottles; and more particularly to a method for making such a bottle from a plastic material, and a bottle produced by the method.

The manufacture of containers for liquids such as nail polish and other materials used in the cosmetics industry involves the production of countless millions of bottles per year. Especially when they are used for cosmetics sold at retail, the appearance of the container is vital to the commercial success of the product. As a result the performance requirements for the container may be hard to meet, and the cost of the container may represent a significant part of the total manufacturing cost of the product.

In choosing container materials and methods of manufacturing, the weight, precision of manufacture, and ruggedness of the container are all critical to the impact on total selling price because of their impact on the cost of other aspects of manufacturing and delivery. Clearly, if the weight of the container becomes great, the shipping costs will go up. This is especially true of the cost of shipping an empty container to a place where it will be filled; bottle weight can also represent a major fraction of the weight of the finished, filled product especially when only a small volume of liquid is contained in the package.

Because of the exclusive use of automatic filling machinery in large scale manufacturing, it is important that containers be molded or otherwise formed with fairly precise dimensions. The cost of a bottle filling machine, and the speed at which it can handle the bottles, is closely related to the dimensional repeatability and fragility of the bottles themselves. For this reason efforts have long been made to develop bottles which would be lighter and yet more rugged, with capability for precision molding.

Cosmetics such as nail polish pose particularly stringent requirements on the container manufacturer. Nail polish is sold to consumers who wish to be able to compare the color, as viewed while it is in the container, with articles of clothing or other cosmetics. The consumer wishes to be assured that the apparent color of the polish while in the bottle is the same as that of the polish when applied to the fingernails, so that critical color matches may be made without extensive trial and error. As a result any color tint in the container is very disadvantageous.

Nail polish is a particularly difficult material to package because it must be presented in a transparent bottle which is resistant to attack by powerful organic solvents conventionally included in the polish, such as acetone, butyl acetate, ethyl acetate, toluene or methylethyl ketone (MEK). Historically, the material of choice for nail polish bottles has always been glass. This material is not only fully resistant to attack by the usual organic solvents, but it is readily available with an excellent combination of transparency and freedom from color tint. Glass bottles, however, suffer the disadvantage that they tend to be fragile, heavy, and not well controlled dimensionally as they leave the mold.

The fragility or brittleness of ordinary glass is of course well known. Because of this characteristic to avoid breakage the wall thickness of a glass bottle for nail polish must be relatively great. No manufacturer can afford lightly to take the chance that his product will break in the consumer's purse, damaging or ruining both the purse and its contents. As a result, most nail polish bottles are quite heavy in comparison to the weight of the contents, and are relatively bulky also for the volume contained. These thick wall sections are more difficult to mold accurately, and as a result the breakage of bottles during automatic filling is relatively high even though the bottles are quite rugged.

2. Description of the Prior Art

In an attempt to avoid all of the above disadvantages of glass, manufacturers have long sought a plastic bottle for use with materials such as nail polish. However, none of these attempts have been truly successful. One reason is that nail polish commonly contains a strong organic solvent. Acetone, toluene, ethyl acetate and butyl acetate are some of the more powerful of the widely available organic solvents, and will attack a great many of the relatively low priced or readily available plastic materials that were known to have the transparency and freedom from color desired in a container for nail polish. For example, the methyl methacrylates have good optical properties but are not solvent resistant. The search therefore has been directed toward the general classes of materials known as barrier resins; that is, those materials demonstrating low permeability to gases such as oxygen, and resistance to chemical attack. However, until now no readily available barrier resin has had the requisite physical properties of transparency and freedom from such color tinting as the yellowish cast of many widely known resins.

One plastic material which has been utilized for a nail polish bottle is low molecular weight acrylonitrile resin. However, bottles of this material have been cloudy in appearance, such that they are translucent rather than transparent, and usually have a purplish cast. This seriously impairs the potential customer's ability to compare the polish color with other materials in the showroom.

Attempts to develop solvent-resistant blends which will exhibit the desired physical characteristics have been unsuccessful. For example, the addition of chlorinated polyethylene to a styrene-acrylonitrile copolymer (SAN) improved resistance to impact and the desired solvents, but when more than 2% chlorinated polyethylene was added in an attempt to attain sufficient solvent resistance, the bottles became cloudy. Similar results were obtained when elastomeric polyester resins such as DuPont Hytrel 5556 series were added to SAN; 5% addition provided inadequate solvent resistance, and at higher levels cloudiness occured.

Another group of materials which have been unsuccessfully tried include polyethylene terephthalate mixtures (PETG). In their pure form these resins exhibit good optical and mechanical properties, but were found to be inadequately resistant to typical strong nail polish solvents. Addition of up to 5% of a modified polyethylene ionomer sold under the tradename Surlyn anhanced the mold release characteristics, but provided too small an increase in solvent resistance. The use of a straight Surlyn ionomer produced a bottle which looked good initially; but upon prolonged exposure to nail polish at elevated temperatures simulating warehouse storage, for example one week at 49° C. (120° F.), the walls softened and caved inward, and there was a loss of gross bottle weight due to solvent permeation through the walls.

Attempts were made to mold a quality nail polish bottle starting with resin that would be adequately resistant to the solvents. PVC, various polyolefins and polyacetals are resistant to one or more of the solvents found in nail polish, but are nearly opaque or inadequately transparent. However, the acrylonitrile resins are known to be good barrier resins, and offered more promise because they are at least semitransparent. In particular, a low molecular weight rubber-modified copolymer of 75% acylonitrile and 25% methylacrylate resin, sold by Vistron Corp. under the tradename of Barex 210 I was tried. This material exhibited satisfory mechanical properties and is unaffected by the nail polish solvents encountered. However, the bottles were blue-purple in color, and tended to show yellow or brown "burn" spots. Extensive attempts to correct the blue tint were unsuccessful, because the addition of sufficient dye to correct the unwanted color caused unexceptable loss of transparency. It was observed that yellowing of the resin was a problem if it was subjected to prolonged heating or processing, but exercising tight control on the processing parameters merely prevented excessive ayellowing and did not cure the blue-purple cast or eliminate burns.

SUMMARY OF THE INVENTION

An object of the invention is to provide a transparent, colorless container for liquids having solvents such as acetone as a constituent, without sacrificing the strength and freedom from fragility commonly found in plastic materials.

Another object of the invention is to provide a nail polish bottle which is light in weight, rugged, and can be molded readily with high precision.

Yet another object of the invention is to provide a method for molding containers free from color unevenness or "burns".

In accordance with one aspect of the invention, disadvantageous properties thought to have been inherent in certain resins are eliminated by a combination of controls on the processing of the resin while molding, and restriction on processing of the raw material by the resin manufacturer. In particular, it has been discovered that straight resin as produced from the reaction chamber can be used as the starting material in a successful nail polish bottle molding method, in which a single heating step is used for blending color correction dyes in the resin and for molding, temperatures are closely controlled to prevent an excessively high overall time-temperature product while avoiding localized heating due to friction heating, and residual gases evolving from the hot plastic are vented.

In contrast with the inventive method, the resin supplier's practice has been to take the straight resin as produced from the reaction chamber, flake or pelletize it, mix dyes with it to overcome the yellow color, melt the resin and disperse the dye throughout the resin, and then cool and pelletize this product for shipment to the user of the plastic. At this point the pelletized resin is blue-purple but still transparent. However, upon molding this commercially available acrylonitrile resin into a bottle, the resulting product is translucent rather than transparent, and has a distinct purplish cast.

In accordance with a preferred embodiment of the invention, a colorless transparent plastic bottle is obtained by the method of mixing selected dye pellets in a predetermined ratio with pellets of resin straight from the reactor (hereinafter referred to as "as-reacted resin" and which typically has a distinct yellow cast), feeding this mixture into a heated reciprocating screw injection unit in which the resin becomes plastic, and by reason of the shearing action of the screw dissolving the dye in and evenly dispersing it throughout the resin to eliminate color in the final product. Without any further cooling and re-heating cycle, the hot plasticized resin-dye mixture is then injected into a parison cavity molding machine, while controlling the temperature profile along the injection barrel and nozzle closely, and venting any residual gases evolving from the hot plastic from the parison molds themselves. Preferably the plastic resin and dye mixture is injected through a balanced runner manifold, the injection gate nozzles have a smaller diameter than would usually be selected for a given machine, as hereinafter explained, and the parison mold itself is heated.

According to a further preferred aspect of the invention, a methylacrylate-acrylonitrile copolymer resin as produced in the reaction chamber is used as the starting material, and to eliminate the yellowish cast a mixture of blue dye and violet dye is added. Further, the temperature of the reciprocating screw injector and the rest of the molding apparatus is maintained cooler but with closer tolerances than normal. The improved optical performance is believed due in part to reduction in the effect of residual or non-polymerized material.

The invention will be described in greater detail hereinafter with respect to the drawing.

DESCRIPTION OF THE PREFERRED EMBODIMENT

The starting point for the preferred method of production of a clear, colorfree nail polish bottle is low molecular weight straight (as-reacted) rubber modified copolymer of 75% acrylonitrile and 25% methylacrylate resin; for example a straight reacted intermediate product which, after its usual further processing, would be sold by Vistron Corporation under the tradename Barex 210 I. The as-reacted resin has a molecular weight in the range 90 to 100,000, and a notch Izod rating of 1.5 ft-lb/in. It is to be understood that the starting material according to the invention is not Barex 210 I, but the intermediate product which has not undergone processing by mixing with dyes and remelting.

The as-reacted resin is provided in pelletized form, and is blended by tumbling with suitable pelletized pigments in any conventional tumbling drum. Where a mixture of different dyes are used, for example a blue dye and a violet dye, it has been found satisfactory to use separately pelletized dyes.

Figure 1:
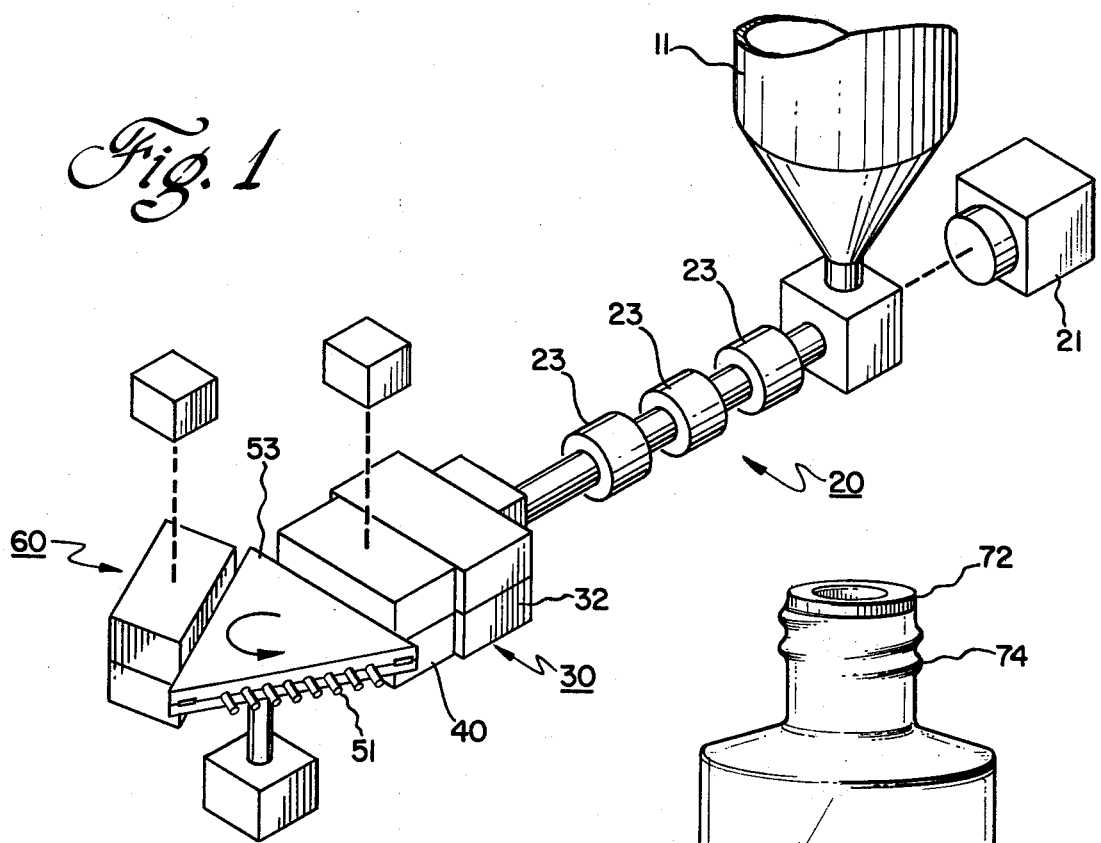
FIG. 1 is a diagrammatic representation of a complete molding apparatus in accordance with the invention.

Referring to FIG. 1, a hopper 11 is diagrammatically shown in which the blended pellets of resin and dye may be dumped, the resin temperature being maintained below its plastic point, and preferably near room temperature. The bottom of the hopper feeds into a conventional reciprocating screw injecting unit 20 having optimized characteristics as described below. The actual screw and barrel assembly is preferably of the "low compression" type. Rotation of the screw and its reciprocation are provided by a motor and ram combination 21 shown diagrammatically. The major length of the screw barrel, within which the dye becomes quickly and evenly dispersed throughout the mass of the resin by reason of the known rotational shearing action of this type of injecting unit, is heated by a sequence of heating units 23 each having its own thermostatic control.

It has been discovered that surprisingly improved results can be obtained when the operating parameters and certain dimensions of the injecting apparatus are selected in accordance with the following goals. In general, the temperature throughout the molding apparatus is maintained lower than would be the expected practice by one of ordinary skill in the art, so that the total time-temperature product to which the resin is exposed is noticeably less than when molding containers whose appearance is less critical. This lower temperature of course causes the resin to have a higher viscosity, so that it is important to minimize areas of shear concentration which might otherwise produce hot spots because of frictional heating, thereby leading to the production of "burns" in the finished product. For example, it is desirable that the nozzle at the output end of the screw barrel, known as the barrel nozzle, have a smooth or conical taper, so as to reduce shear forces within the nozzle, and be kept short.

The profile of temperature over the barrel length, and the temperature at the barrel nozzle are maintained above the plastic point temperature for the resin used, and are adjusted as a result of experimentation to match the actual dimensions and surface finishes of the particular reciprocating screw injecting unit. Production of excellent quality clear bottles has been obtained by providing three separate heating zones along the length of the screw, plus a separately controlled zone at the barrel nozzle. Different injecting units of the same design and size will be found by those of ordinary skill in the art to provide optimum molding results with temperature profiles selected to the individual machine because of unavoidable minor differences in internal dimensions and surface finishes. With the resin identified above, a typical profile utilizes temperatures in the range of 161° C. to 167° C. (290° F. to 300° F.) at the feeding end, and about 193° C. (380° F.) at the barrel nozzle, with the temperature controllers selected and adjusted to control the temperature to a tolerance of ±3° C. (±5° F.).

Figure 2:
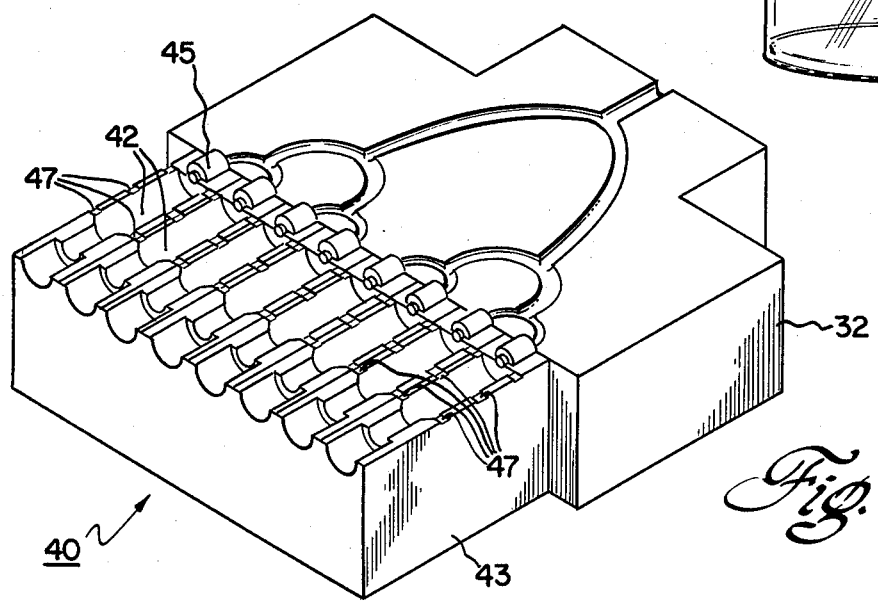
FIG. 2 is a diagrammatic representation of a balanced runner manifold showing the nozzle gates, and the vented parison cavity.

As the resin is advanced through the injection unit by successive reciprocations, it eventually reaches the outlet end of the injection unit and is forced through the barrel nozzle into a balanced runner manifold 30 whose lower portion 32 is shown in general outline in FIG. 2. The manifold supplies resin to a number of parison cavities 42 in a mold 40, whose lower half 43 is shown in FIG. 2. In this embodiment eight cavities are used, although for some high production purposes a greater number may be preferable.

Balanced runner manifolds are, as course, known by those of ordinary skill to be the preferable type when heat sensitive material is being injected. It has been found advantageous to use multiple heating zones with such a manifold, so that resin temperature can be held essentially constant from the barrel nozzle to the nozzle gate at each comparison cavity inlet, this temperature being about the same as that of the downstream end of the barrel. At the nozzle gate, the nozzle tip may be allowed to be slightly cooler than the manifold.

For the particular modified polyacrylonitrile resin and injection temperature preferred, it has been found that the size of the nozzle opening in the nozzle gate 45 should be significantly smaller than the 1.2 mm (0.05 inches) or larger nozzle that would ordinarily be selected. An opening of 0.71 mm (0.028 inches) to 1.0 mm (0.04 inches) is preferred, the exact diameter being chosen so as to obtain optimum molding results. If, in an attempt to speed the molding process, a larger nozzle opening is utilized, it has been discovered that the nozzle may not strip clean when the turret rotates to advance the injected parison to the blowing position. If the opening is made smaller than this size range, freezing at the nozzle tip may become a problem, and the injection pressure will be found to be quite great.

When the manufacturing method described so far is performed, with injection into a conventional unvented parison cavity, bottles with cloudy blemishes and flow lines have been produced. Contrary to the commonly recommended practice of acknowledged experts, improved results in blow molding a clear plastic bottle from a resin which is relatively viscous because it is maintained at a relatively low temperature are obtained by the use of a vented parison cavity in which the threaded end of the bottle is formed to final dimensions. According to the preferred embodiment shown in FIG. 2, the parison cavity vents are formed by 12 micron (0.0005 inch) deep channels 47 in the mating mold halves. It is believed that a factor in the superior results obtained is that the venting permits more uniform flow of the injected resin into the chamber, while at the same time any gases such as might be produced by a slight residue of unpolymerized material in the resin can readily escape rather than remaining dissolved in the resin.

Figure 3:
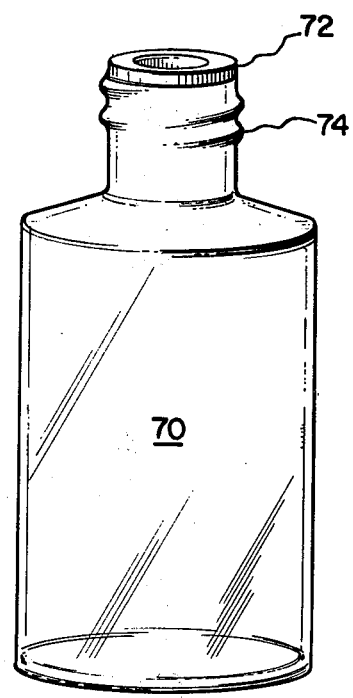
FIG. 3 is a perspective view of a nail polish bottle according to the invention showing the translucent wiper insert.

The core rods for the parison cavities are mounted on a turret or indexing table 53. The parison cavity is formed by a split mold 40 in which the threaded neck 74 of a bottle 70 shown in FIG. 3 is formed. The mold 40 opens conventionally after the parison has been formed, the upper halves lifting rapidly, and the table 53 and core rods more slowly, permitting the eight parisons to be brought by the core rods as the table rotates to a blow molding station 60. When blow molding proceeds at that second station, the parison cavity mold 40 will again be closed on the next set of core rods to form eight new parisons.

Blow molding is performed in the usual manner, without any unusual requirements as to temperature or other conditions. For example, the blowing mold temperatures may be 27°-43° C. (80°-110° F.) depending on the bottle shape, and may vary 11° C. (20° F.) or more depending on the type of machine used or cycle time, and size of container.

After the bottles (i.e., in this embodiment, a set of eight bottles) have been finally formed in the blowing mold 60, the mold 60 opens and the table 53 again indexes to the third position, at which the eight bottles are ejected from the core rods by conventional mechanisms not shown, as that the cycle may continue.

At this state of the process the bottles will be transparent and essentially colorless. Completion of manufacture of the bottle 70 involves insertion of a conventional wiper 72, which may be of any appropriately solvent resistant plastic, because when the bottle is closed the wiper is concealed by the cap so that its color or transparency are unimportant.

To take advantage of the surface properties of the acrylonitrile plastic, the bottle may be marked by embossing an ink design in a color which is in contrast to the nail polish or other contents intended for the bottle. A very crisp, clean appearance is thus possible.

The invention has been described above with reference to a particular resin and dye combination found suitable for use with nail polish. The as-reacted intermediate product, which after further processing would be sold as Vistron Barex 210 I brand acrylonitrile resin, is brought to a neutral color in the preferred embodiment by adding a mixture of dyes consisting of 1 part by weight of FD&C blue No. 2, aluminum lake (for example, B-3017 Lakolene as sold by H. Kohnstamm & Co.) blue dye, and 40 parts by weight FD&C violet No. 1, aluminum lake (for example code 090-7105 as sold by the Specialty Chemicals division of Allied Chemical Corp,) violet dye, per 40,000 parts by weight of resin. If the same basic type resin is obtained from another source, a small amount of experimentation may be required to achieve the desired degree of color neutrality. It of course must be recognized that color neutrality as described herein is measured by the response of the human eye, which integrates the effect of greater or lesser prominence of different parts of the color spectrum.

Further, many other dyes are available from which to select for the purpose of obtaining neutral color. A representative list of those dyes is found in Atlas Colors or Allied Specialty Chemicals sales literature.

From the foregoing description it will be clear to those of ordinary skill in the plastic molding art that the temperature chosen, nozzle diameters, screw rotation and ram speed are interrelated. By increasing the temperature of the apparatus, and as a result that of the resin, the resin viscosity of course will decrease so that it flows more rapidly or by lower ram pressure into the parison mold. Such a higher temperature, of course, increases the risk that burns in the final product will result from localized overheating of the resin in the screw injector, that the nozzle gates may not strip clean, and that because of the lower viscosity an undesired molding flash may be formed in the vents in the parison cavity. This latter problem will be recognized by those of ordinary skill as being a reason that such a vented cavity can not be used with such other common blow molding resins as the polypropylene, polyethylene, or cellulose acetate propionate families.

Because of the unavoidable surface finish and dimensional differences between supposedly identical machines, slightly different temperature and pressure profiles may be determined to provide the best results at different work stations utilizing the same raw materials. Again, different sizes of bottle will usually be made with somewhat proportional differences in wall thickness, so that substantial variation in the amount of resin to be injected per mold may suggest the desirability of molding larger bottles at higher temperature. As an example, one inch diameter bottles might have a wall thickness in the range of 0.64 to 0.71 mm (0.025 inches to 0.028 inches), with 18 ml bottles having wall thickness perhaps as large as 0.97 mm (0.038 inches). Of course, it will be noted that these values are perhaps only one-quarter to one-third of the wall thickness which may be necessary for a satisfactory high strength glass bottle.

When performing the inventive method using the preferred resin, it will be noted that the reciprocating screw injector will develop a higher than average initial injection pressure; typically, the ram pressure rises almost to its peak value shortly after the beginning of the stroke, because the temperature has been held at a relatively low value so that the resin is quite viscous. It must be emphasized however that in accordance with the spirit of the invention high processing temperatures such as those previously used must be avoided, as well as any repetitive heat cycling which may tend to cause "burns" or cloudiness in the finished bottle.

If transparent color-free bottles are to be molded for materials having less powerful solvent systems then nail polish, previously known barrier resins having less solvent resistance then the acrylonitrile resins may be satisfactory. Where such a resin is heat sensitive, and is not inherently color-free, to maintain the desired clarity and color purity of the finished product the use of as-reacted resin eliminates the hopeless frustration of overcoming the effect of one dye by adding another, which double-dyeing causes opacity as well as "using up" the time-temperature life of the resin.

From the description given above it is thus clear that through the practice of the inventive method a transparent, color-free bottle having no "burns" due to resin degradation, and yet resistant to such strong solvents as are found in nail polishes, may be economically provided by molding the bottle from a barrier resin; and that various changes in form and details from the preferred embodiment may be made without departing from the spirit and the scope of the invention.

I claim:

1. A method of making a transparent, colorless, strong-solvent-resistant bottle comprising the following steps:
    (a) providing a mixture of particles of transparent as-reacted low molecular weight polyacrylonitrile resin having a natural yellow cast and a sufficient quantity of a dye material, compatible with said resin and having a complementary color which when dispersed throughout said resin in a given ratio will cancel the color of the resin, to provide said given ratio,
    (b) feeding the resin-dye mixture into a feeding end of a heated reciprocating screw injection unit and dispersing said dye material uniformly throughout the resin to form a colorless plastic, by intermittent rotation of the screw, as the resin-dye mixture is fed from the feeding end to a barrel nozzle,
    (c) determining by experimentation a temperature profile for the screw injection unit and a barrel nozzle temperature, to match actual dimensions and surface finishes of the particular screw injection unit, said profile being selected to be the minimum time-temperature product which is sufficiently above the plastic point temperature for the resin used to avoid frictional heating hot spots due to shear concentration, said profile having a temperature rising from the feeding end to the barrel nozzle,
    (d) maintaining the temperature of the screw injection unit at said experimentally determined temperature profile along the length of the unit, within a tolerance of approximately ±3° C., (e) without any further cooling and reheating cycle injecting said colorless plastic a parison mold, (f) venting any gases released from the resin in the parison mold, (g) transferring the parison to a blowing mold while maintaining the colorless material in a plastic state, and (h) forming the colorless plastic into a bottle in the blowing mold.

2. A method as claimed in claim 1, wherein said profile comprises three separate heating zones along the length of the screw, and a separate zone at the barrel nozzle.

3. A method as claimed in claim 2, wherein said unit comprises a balanced runner manifold having multiple heating zones, and said maintaining step includes maintaining the resin temperature along the manifold runners at approximately the temperature of the downstream end of the barrel nozzle.

4. A method of making a transparent, colorless, strong solvent-resistant bottle comprising the following steps:

(a) providing a mixture of particles of transparent as-reacted rubber modified copolymer of approximately 75% acrylontrile and approximately 25% methylacrylate resin, having a molecular weight in the range 90 to 100,000, said resin having a natural yellow cast; and a sufficient quantity of a dye material, compatible with said resin and having a complementary color which when dispersed throughout said resin in a given ratio will cancel the color of the resin, to provide said given ratio, (b) feeding the resin-dye mixture into a feeding end of a heated reciprocating screw injection unit and dispersing said dye material uniformly throughout the resin to form a colorless plastic, by intermittent rotation of the screw, as the resin-dye mixture is fed to the feeding end to a barrel nozzle, (c) determining by experimentation a temperature profile for the screw injection unit and a barrel nozzle temperature, to match actual dimensions and surface finishes of the particular screw injecting unit, said profile having a temperature at the feeding end having a nominal value of approximately 164° C., said profile being selected to be the minimum time-temperature product which avoids frictional heating hot spots due to shear concentration, said profile showing a temperature rise from the feeding end to the barrel nozzle, (d) maintaining the temperature of the screw injection unit at said experimently determined temperature profile along the length of the unit, within a tolerance of approximately ±3° C., (e) without any further cooling and reheating cycle injecting said colorless plastic into a parison mold, (f) venting any gases released from the resin in the parison mold, (g) transferring the parison to a blowing mold while maintaining the colorless material in a plastic state, and (h) forming the colorless plastic into a bottle in the blowing mold.

5. A method as claimed in claim 4 wherein said dye consists of FD&C blue No. 2, aluminum lake blue dye and FD&C violet No. 1, aluminum lake violet dye and a ratio of 1 part blue to 40 parts violet to 40,000 parts resin, by weight.

6. A method as claimed in claim 4, wherein said profile comprises three separate heating zones along the length of the screw and a separate zone at the barrel nozzle, and said feeding end temperature has a nominal value between 161° C. and 167° C.

7. A method as claimed in claim 6, wherein the temperature at the barrel nozzle outlet of the screw injection unit is approximately 193° C.

8. A method as claimed in claim 7 wherein said unit comprises a balanced runner manifold having multiple heating zones, and said maintaining step includes maintaining the resin temperature along the manifold runners at approximately the temperature of the downstream end of the barrel nozzle, the balanced runner manifold terminating in a plurality of nozzle gates each having an opening between 0.7 and 1.0 mm.

9. A method as claimed in claim 8 wherein said venting step comprises venting through parison cavity vents having a width of approximately 24 microns.

10. A transparent, colorless, strong-solvent-resistant bottle, comprising a rubber modified copolymer resin of approximately 75% acrylonitrile and approximately 25% methylacrylate resin, having a molecular weight in a range 90 to 100,000, made by the method claimed in claim 4, 5, 6, 7, 8 or 9.

* * * * *